(12) United States Patent
Jaekel

(10) Patent No.: US 7,770,336 B2
(45) Date of Patent: Aug. 10, 2010

(54) MULTIPLE-LEVEL ROTARY WORK SURFACE

(75) Inventor: Federico Guillermo Jaekel, Aurora (CA)

(73) Assignee: Martinrea International Inc., Vaughan (CA)

( * ) Notice: Subject to any disclaimer, the term of this patent is extended or adjusted under 35 U.S.C. 154(b) by 613 days.

(21) Appl. No.: 11/463,770

(22) Filed: Aug. 10, 2006

(65) Prior Publication Data

US 2008/0035028 A1    Feb. 14, 2008

(51) Int. Cl.
*E04B 1/346*    (2006.01)
*E04B 7/16*    (2006.01)

(52) U.S. Cl. .................... 52/65; 52/7; 108/103; 108/94; 211/56; 211/58; 211/165

(58) Field of Classification Search .................... 108/20, 108/21, 22, 103, 94, 95; 52/7, 6, 64, 65; 211/56, 58, 70, 78, 129.1, 131.1, 144, 163, 211/165

See application file for complete search history.

(56) References Cited

U.S. PATENT DOCUMENTS

| | | | | |
|---|---|---|---|---|
| 1,434,089 A * | 10/1922 | Christensen | ................ | 422/269 |
| 3,056,506 A | 10/1962 | Fuller et al. | | |
| 3,245,545 A * | 4/1966 | Lortie | ........................ | 211/1.55 |
| 3,993,375 A * | 11/1976 | Potter | ......................... | 312/197 |
| 4,043,276 A * | 8/1977 | Dahl | ............................ | 108/28 |
| 4,236,769 A * | 12/1980 | Mueller | ...................... | 312/135 |
| 4,656,951 A * | 4/1987 | Kimura et al. | ................ | 108/20 |
| 4,857,347 A * | 8/1989 | Webb | ......................... | 426/438 |
| 5,018,923 A | 5/1991 | Melan et al. | | |
| 5,163,651 A * | 11/1992 | Matsumoto | .................. | 248/425 |
| 6,279,490 B1 * | 8/2001 | Pastor | ......................... | 108/94 |
| 6,280,341 B1 * | 8/2001 | Hayashi | ........................ | 472/61 |
| 6,543,369 B1 * | 4/2003 | Swensson et al. | ............. | 108/49 |
| 6,665,985 B1 * | 12/2003 | Hennes | ............................ | 52/7 |
| 6,761,772 B2 | 7/2004 | Giacri et al. | | |
| 6,877,442 B2 * | 4/2005 | Helle | .......................... | 108/147 |
| 6,908,000 B2 * | 6/2005 | Craft et al. | ................... | 211/144 |
| 7,273,314 B1 * | 9/2007 | Whited | ..................... | 366/172.1 |
| 2003/0173321 A1 | 9/2003 | Craft et al. | | |
| 2003/0196978 A1 | 10/2003 | Humphrey | | |

FOREIGN PATENT DOCUMENTS

| CA | 1176209 | 10/1984 |
|---|---|---|
| CA | 2074369 | 7/1991 |

* cited by examiner

*Primary Examiner*—Richard E Chilcot, Jr.
*Assistant Examiner*—Chi Q Nguyen
(74) *Attorney, Agent, or Firm*—Dimock Stratton LLP; Mark B. Eisen

(57) ABSTRACT

A multi-tiered rotary workstation comprises at least two rotary work spaces supported at different levels, with associated workstation floors, substantial increasing the amount of work space available within a fixed floor space.

18 Claims, 3 Drawing Sheets

MULTIPLE-LEVEL ROTARY WORK SURFACE

FIELD OF THE INVENTION

This invention relates to manufacturing. In particular, this invention relates to a work surface for use in manufacturing.

BACKGROUND OF THE INVENTION

Manufacturers are constantly striving to maintain a competitive edge in the marketplace by reducing costs and increasing throughput. Particularly in the case of mass manufactured products, for example automobile parts, even a small decrease in manufacturing costs or a slight increase in manufacturing efficiency can make a significant difference in the manufacturer's competitiveness.

Work space is usually one of the more significant costs of a manufacturing operation, so one way of reducing manufacturing costs is to improve the efficiency of work space usage. Most manufacturing facilities are located indoors, within a structure that provides a fixed amount of floor space for manufacturing equipment and processes. Accordingly, it would be beneficial to a manufacturer to increase the amount of work surface available for manufacturing equipment and processes within a fixed floor space, which allows more workers to work in the same floor space.

SUMMARY OF THE INVENTION

The present invention provides a multi-tiered rotary workstation. The workstation comprises at least two rotary work spaces supported at different levels, with associated workstation floors, substantially increasing the amount of work space available within a fixed floor space.

BRIEF DESCRIPTION OF THE DRAWINGS

In drawings which illustrate by way of example only a preferred embodiment of the invention.

DETAILED DESCRIPTION OF THE INVENTION

Figure 1:
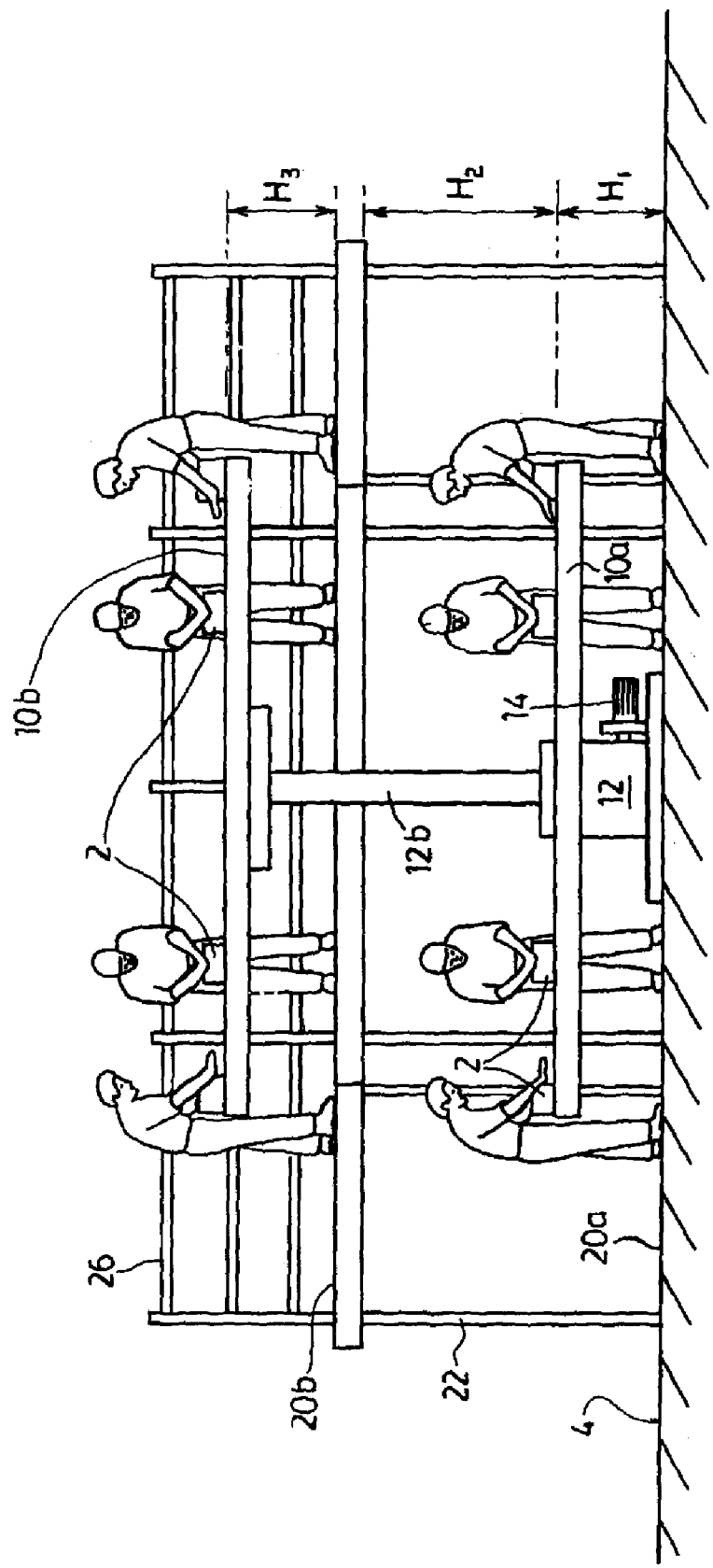
FIG. 1 is a side elevation of rotary workstation according to one embodiment of the invention.
Figure 2:
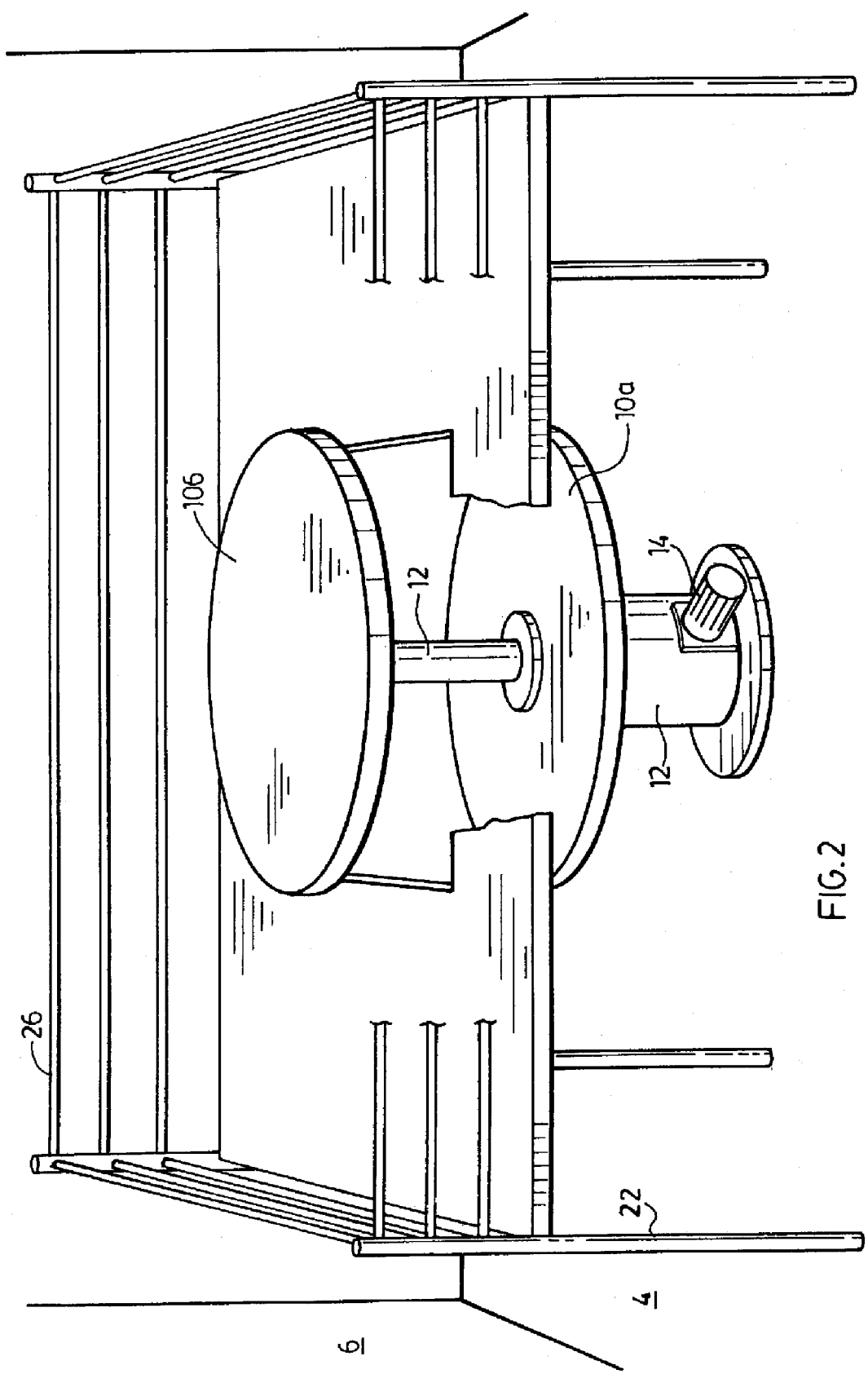
FIG. 2 is a partly cutaway isometric view of the rotary workstation shown in FIG. 1.

FIGS. 1 and 2 illustrate a preferred embodiment of a rotary workstation according to the invention. The workstation comprises a plurality of rotary work surfaces 10 mounted at different levels. In the embodiment illustrated the workstation has two levels 10a, 10b, however it will be appreciated that the principles of the invention can be applied to any number of additional rotary work surfaces, with suitable support having regard to the number of worker stations at each work surface 10 and the weight of the equipment (not shown) and work pieces 2 that will be supported on the work surfaces 10.

The first level work surface 10a is rotationally mounted at a first level, and is associated with a stationery first level workstation floor 20a upon which the workers working at the first level work surface 10a stand or sit. In the preferred embodiment the first level workstation floor 20a may be the floor 4 of the building, as shown in FIGS. 1 and 2, or alternatively the first level workstation floor 20a may be a recess (not shown) formed in the floor 4 of the building or set on a riser or stage (not shown) above the floor 4 of the building. The first level work surface 10a is disposed at a height $H_1$ above the first level workstation floor 20a that allows workers positioned at workstations about the first level work surface 10a to work comfortably on the first level work surface 10a. This height $H_1$ may vary depending upon the type of work being done, the nature of the equipment and/or work pieces 2 on the work surface 10, and whether the workers are standing or seated when working.

At least one additional rotary work surface 10b is provided. The second level work surface 10b is disposed above the first level work surface 10a. The second level work surface 10b is associated with a stationery second level workstation floor 20b which supports one or more second level workers. The second work surface 10b is disposed at a height $H_3$ above the second workstation floor 20b that allows one or more second level workers to work comfortably on the second level work surface 10b. The second level workstation floor 20b is in turn disposed at a height $H_2$ above the first level workstation floor 20a that allows the first level workers to work on the first level workstation floor 20a with sufficient clearance above their heads that the workers can move about unimpeded, and with sufficient clearance to accommodate any equipment (not shown) on the first level work surface 10a.

In the embodiment shown the second level workstation floor 20b is a stage supported on a suitable infrastructure 22, which may for example be scaffolding or a more permanent infrastructure, and having a safety railing 26 surrounding the workstation floor 20b. Suitable means such as a ladder or staircase (not shown) is provided to enable the second level workers to climb up to and down off of the second level workstation floor 20b. The second level workstation floor 20b in the preferred embodiment surrounds the entire second work surface 10b, allowing workers to position themselves to most efficiently undertake the manufacturing processes and procedures for which the second level work surface 10b has been designated (one side of the second level workstation floor 20b shown in the drawings has been cut away to show the work surfaces 10a, 10b).

The first and second level work surfaces 10a, 10b are supported on a suitable rotary support 12 driven by a motor 14 through a suitable transmission mechanism (not shown). The rotation rate of the work surface 10a, 10b, stopping points (if any) and any other rotation parameters may be set and controlled in any conventional fashion.

In operation, first level workers are disposed on the first level workstation floor 20a (in the embodiment shown, the floor 4 of the manufacturing premises) and disposed at stations about the first level work surface 10a. Similarly, the second level workers climb up to the second level workstation floor 20b and position themselves at workstations disposed about the second level work surface 10b. With the first level workers and second level workers in position, the motor 14 is activated to rotate the first and second level work surfaces 10a, 10b on the rotary support 12. The first level workers and second level workers each undertake the manufacturing processes and procedures designated for their respective work surfaces 10a, 10b as the work surfaces 10b, 10b rotate.

Figure 3:
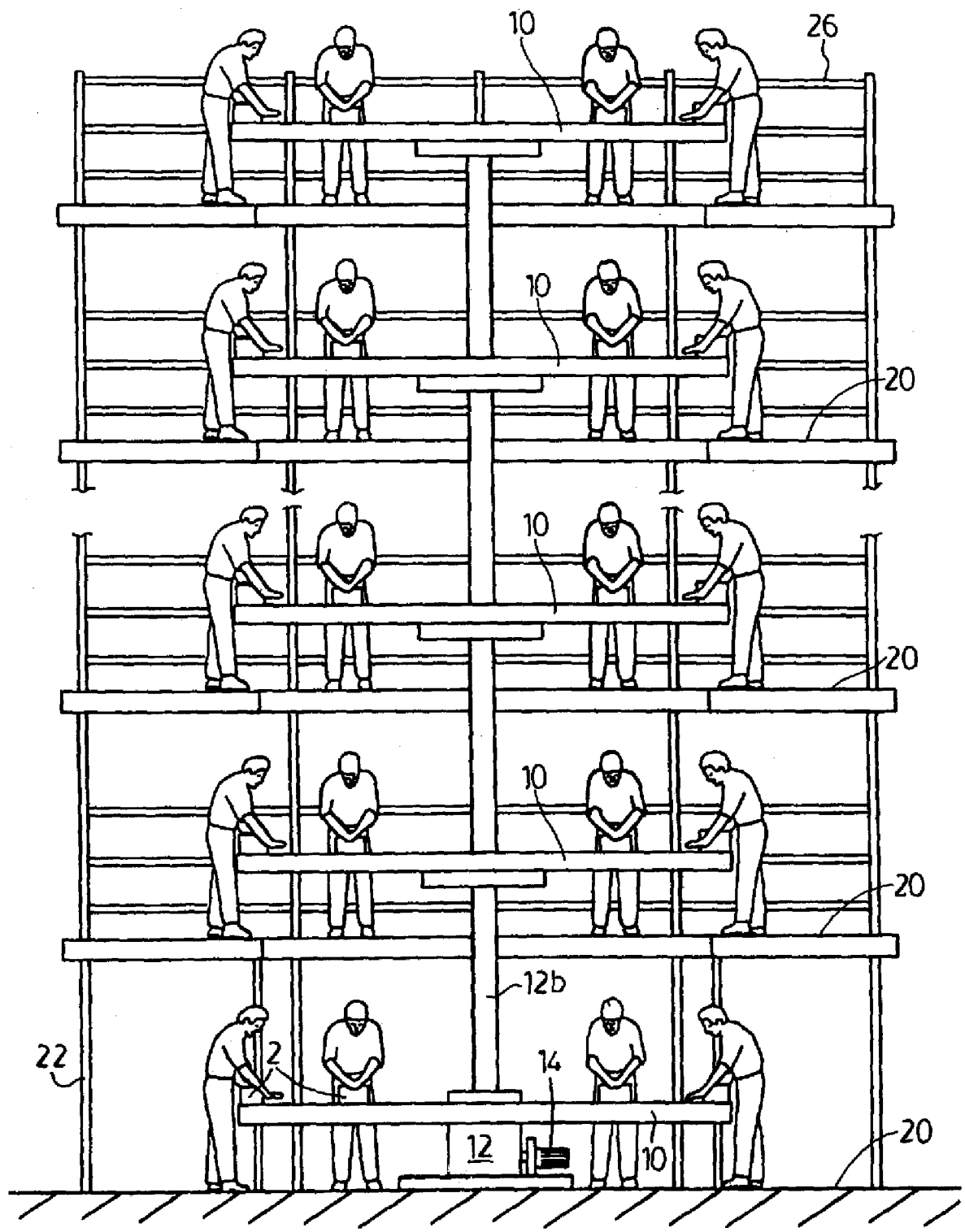
FIG. 3 is a side elevation of rotary workstation having more than two levels.

The embodiment of the invention illustrated in FIGS. 1 and 2 thus doubles the number of workers who can be stationed in a given floor space about a rotary workstation, by providing two-level rotary work surfaces 10a, 10b. Any number of additional work surfaces may be provided, each additional work surface 10 being associated with a stationary workstation floor 20 upon which the workers are positioned to work on the associated work surface, for example as in the embodiment of FIG. 3. It will be appreciated that the term "workstation floor" as used herein refers to any structure capable of supporting a worker, whether it be the floor 4 of the building, a riser, a scaffold, a stage supported on walls 6 of the building or other vertical bearing structures, and any other structure capable of supporting a worker.

In the preferred embodiment the second work surface 10b is mounted substantially concentrically on the first work surface 10a. The second work surface 10b may rotate with the first work surface 10a, or with suitable modifications (and if necessary one or more additional motors) the work surfaces 10 can be designed to rotate independently, at different rates and even in different directions. For example, in the embodiment shown the second level work surface 10b is supported by a secondary rotary support 12b which is contained within and rotates independently of the primary rotary support 12 supporting the first level work surface 10a, via any suitable transmission mechanism contained within the rotary support 12, as will be well known to those skilled in the art.

Further, although in the embodiment shown both work surfaces 10a, 10b are mounted on a rotary support 12 supported on the floor 4 of the building, it will be appreciated that the work surfaces 10 can alternatively be supported in other ways. For example, each work surface 10 may be independently mounted on a rotary support supported by its associated workstation floor 20, for example by a spider or frame (not shown) extending across the open centre of the workstation floor 20. It will further be appreciated that each next higher level of work surface 10 may be supported on the next lower work surface 10 (if both work surfaces rotate together), or all work surfaces 10 may be supported on a single rotary support 12. In all of these cases the advantages of the invention are obtained by providing an associated stationary workstation floor 20 supporting workers positioned at one or more workstations about the rotary work surface 10 at each level.

Various embodiments of the present invention having been thus described in detail by way of example, it will be apparent to those skilled in the art that variations and modifications may be made without departing from the invention. The invention includes all such variations and modifications as fall within the scope of the appended claims.

I claim:

1. A rotary work surface, comprising
   a rotationally mounted first level work surface disposed at a first level, associated with a stationary first level workstation floor, wherein the first level workstation floor is a floor of a building, for supporting at least one first level worker, the first level work surface being disposed at a height above the first level workstation floor that allows the at least one first level worker to work on the first level work surface, and
   a rotationally mounted second level work surface disposed at a second level above the first level, associated with a stationary second level workstation floor for supporting at least one second level worker, the second level work surface being disposed at a height above the second level workstation floor that allows the at least one second level worker to work on the second level work surface,
   the second level workstation floor being disposed at a height above the first level workstation floor that allows the at least one first level worker to work on the first level workstation floor.

2. The rotary work surface of claim 1 comprising a rotating support for rotationally supporting the first level work surface and second level work surface.

3. The rotary work surface of claim 2 wherein the rotating support rotationally supports supporting the first level work surface and the second level work surface is mounted on the first level workstation floor.

4. The rotary work surface of claim 1 wherein the second level workstation floor comprises a stage.

5. The rotary work surface of claim 1 wherein the first workstation floor and second workstation floor surrounds the first level work surface and second level work surface, respectively.

6. The rotary work surface of claim 1 wherein the first level work surface and the second level work surface rotate together.

7. The rotary work surface of claim 1 wherein the first level work surface and the second level work surface rotate independently.

8. The rotary work surface of claim 1 comprising at least a third level work surface disposed at a level above the second level, associated with a stationary third level workstation floor for supporting at least one third level worker, the third level work surface being disposed at a height above the third level workstation floor that allows the at least one third level worker to work on the third level work surface, the third level workstation floor being disposed at a height above the second level workstation floor that allows the at least one second level worker to work on the second level workstation floor.

9. The rotary work surface of claim 8 comprising at least one additional work surface disposed above the third level work surface.

10. A method of manufacturing, comprising the steps of:
    a. positioning at least one first level worker at a workstation of a rotationally mounted first level work surface disposed at a first level, the first level work surface being associated with a stationary first level workstation floor, wherein the first level workstation floor is a floor of a building, for supporting the at least one first level worker, the first level work surface being disposed at a height above the first level workstation floor that allows the at least one first level worker to work on the first level work surface,
    b. positioning at least one second level worker at a workstation of a second level work surface disposed at a second level above the first level, the second level work surface being associated with a stationary second level workstation floor for supporting the at least one second level worker and being disposed at a height above the second level workstation floor that allows the at least one second level worker to work on the second level work surface, the second level workstation floor being disposed at a height above the first level workstation floor that allows the at least one first level worker to work on the first level workstation floor, and
    c. rotating one or both of the first level work surface and the second level work surface.

11. The method of claim 10 in which the work surfaces are rotationally supported by a rotating support.

12. The method of claim 11 wherein the rotating support rotationally supporting the first level work surface and the second level work surface is mounted on the first level workstation floor.

13. The method of claim 10 wherein the second level workstation floor comprises a stage.

14. The method of claim 10 wherein the first workstation floor and second workstation floor surround the first level work surface and second level work surface, respectively.

15. The method of claim 10 wherein the first level work surface and the second level work surface are rotated together.

16. The method of claim 10 wherein the first level work surface and the second level work surface are rotated independently.

17. The method of claim 10 comprising the additional steps of:
   d. positioning at least one third level worker at a workstation of a third level work surface disposed at a third level above the second level, the third level work surface being associated with a stationary third level workstation floor for supporting the at least one third level worker and being disposed at a height above the third level workstation floor that allows the at least one third level worker to work on the third level work surface, the third level workstation floor being disposed at a height above the second level workstation floor that allows the at least one second level worker to work on the second level workstation floor, and
   e. rotating the third level work surface.

18. The method of claim 17 comprising at least one additional work surface disposed above the third level work surface.

* * * * *

UNITED STATES PATENT AND TRADEMARK OFFICE
CERTIFICATE OF CORRECTION

PATENT NO.         : 7,770,336 B2                                          Page 1 of 1
APPLICATION NO.  : 11/463770
DATED                : August 10, 2010
INVENTOR(S)       : Federico Guillermo Jaekel It is certified that error appears in the above-identified patent and that said Letters Patent is hereby corrected as shown below:

DELETE the word "supports" from Claim 3: Column 4, lines 1-4 should read
--3. The rotary work surface of claim 2 wherein the rotating support rotationally supporting the first level work surface and the second level work surface is mounted on the first level workstation floor.--

DELETE the terminal letter "s" in the word "surrounds" from Claim 5: Column 4, lines 7-10 should read
--5. The rotary work surface of claim 1 wherein the first workstation floor and second workstation floor surround the first level work surface and second level work surface, respectively.--

Signed and Sealed this

Nineteenth Day of October, 2010

David J. Kappos
*Director of the United States Patent and Trademark Office*